United States Patent
Huang et al.

(10) Patent No.: US 9,542,113 B2
(45) Date of Patent: Jan. 10, 2017

(54) APPARATUSES FOR SECURING PROGRAM CODE STORED IN A NON-VOLATILE MEMORY

(71) Applicant: Nuvoton Technology Corporation, Hsinchu Science Park (TW)

(72) Inventors: Chen Chun Huang, Hsinchu (TW); Kuo En Hsu, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 15/169,421

(22) Filed: May 31, 2016

(65) Prior Publication Data

US 2016/0274811 A1 Sep. 22, 2016

Related U.S. Application Data

(63) Continuation of application No. 14/227,154, filed on Mar. 27, 2014.

(30) Foreign Application Priority Data

Nov. 22, 2013 (TW) .............................. 102142579 A

(51) Int. Cl.
G06F 12/00 (2006.01)
G06F 3/06 (2006.01)
G06F 12/14 (2006.01)
G06F 12/02 (2006.01)

(52) U.S. Cl.
CPC .......... *G06F 3/0623* (2013.01); *G06F 3/0629* (2013.01); *G06F 3/0679* (2013.01); *G06F 12/0246* (2013.01); *G06F 12/1425* (2013.01)

(58) Field of Classification Search
CPC .................... G06F 12/0246; G06F 12/1425
USPC .......................................... 711/103, 163, 154
See application file for complete search history.

(56) References Cited

U.S. PATENT DOCUMENTS

| | | | |
|---|---|---|---|
| 6,505,279 B1 | 1/2003 | Phillips et al. | |
| 7,757,231 B2 | 7/2010 | Anderson et al. | |
| 8,341,369 B2 | 12/2012 | Savagaonkar et al. | |
| 8,547,724 B2 | 10/2013 | Lee et al. | |
| 2013/0238831 A1* | 9/2013 | He ......................... | G06F 21/79 711/103 |

(Continued)

OTHER PUBLICATIONS

TW Office Action dated Jun. 22, 2015 from corresponding TW Appl No. 102142579, 11 pp.

*Primary Examiner* — Pierre-Michel Bataille
(74) *Attorney, Agent, or Firm* — Muncy, Geissler, Olds & Lowe, P.C.

(57) ABSTRACT

An embodiment of an apparatus for securing program code stored in a non-volatile memory is introduced. A non-volatile memory contains a first region and a second region. Two NVMMCS (non-volatile memory management controllers) are respectively coupled to the two regions. A programming command-and-address decoder is coupled to the NVMMCS. The programming command-and-address decoder instructs the first NVMMC to erase data from the first region when receiving a command to erase the first region via a programming interface, and instructs the second NVMMC to erase data from the second region when receiving a command to erase the second region via the programming interface.

3 Claims, 3 Drawing Sheets

(56) References Cited

U.S. PATENT DOCUMENTS

2013/0304980 A1* 11/2013 Nachimuthu ......... G06F 9/4403
                                                    711/103
2014/0317372 A1    10/2014 Herrick et al.

* cited by examiner

APPARATUSES FOR SECURING PROGRAM CODE STORED IN A NON-VOLATILE MEMORY

CROSS REFERENCE TO RELATED APPLICATIONS

This is a continuation application (CA) of and claims priority benefit of patent application Ser. No. 14/227,154 filed on Mar. 27, 2014, which claims priority benefit of Taiwan Patent Application No. 102142579, filed on Nov. 22, 2013. The entirety of which is incorporated by reference herein.

BACKGROUND

Technical Field

The present invention relates to program code protection, and in particular to apparatuses for securing program code stored in a non-volatile memory.

Description of the Related Art

A secure apparatus is one that protects the contents of the device from unauthorized copying or alteration. Secure content includes program code whose security against access and copying by those other than the owner or other authorized persons is desirable. Accordingly, what is needed are apparatuses for securing program code stored in a non-volatile memory.

BRIEF SUMMARY

An embodiment of an apparatus for securing program code stored in a non-volatile memory is introduced. A non-volatile memory contains a first region and a second region. Two NVMMCS (non-volatile memory management controllers) are coupled to the two regions, respectively. A programming command-and-address decoder is coupled to the NVMMCS. The programming command-and-address decoder instructs the first NVMMC to erase data from the first region when receiving a command to erase the first region via a programming interface, and instructs the second NVMMC to erase data from the second region when receiving a command to erase the second region via the programming interface.

Another embodiment of an apparatus for securing program code stored in a non-volatile memory is introduced. A non-volatile memory contains a security byte, in which a security byte value is employed to indicate the non-volatile memory is in an available status or a protected status. A NVMMC coupled to the non-volatile memory accesses data stored in the non-volatile memory. A CPU (central processing unit) coupled to the NVMMC commands the NVMMC to access the data stored in the non-volatile memory. A chip debugger coupled to the CPU obtains the security byte value when receiving a debugging command from a debugging interface; performs at least a determination according to the security byte value; and decides whether to block the debugging command from execution according to a result of the determination.

Still another embodiment of an apparatus for securing program code stored in a non-volatile memory is introduced. A non-volatile memory contains a security byte, in which a security byte value is employed to indicate the non-volatile memory is in an available status or a protected status. A NVMMC coupled to a CPU obtains a command to read program code stored in the non-volatile memory; obtains the security byte value; and replies to the CPU with the security byte value rather than the program code of the non-volatile memory when the security byte value indicates that the non-volatile memory is in the protected status.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
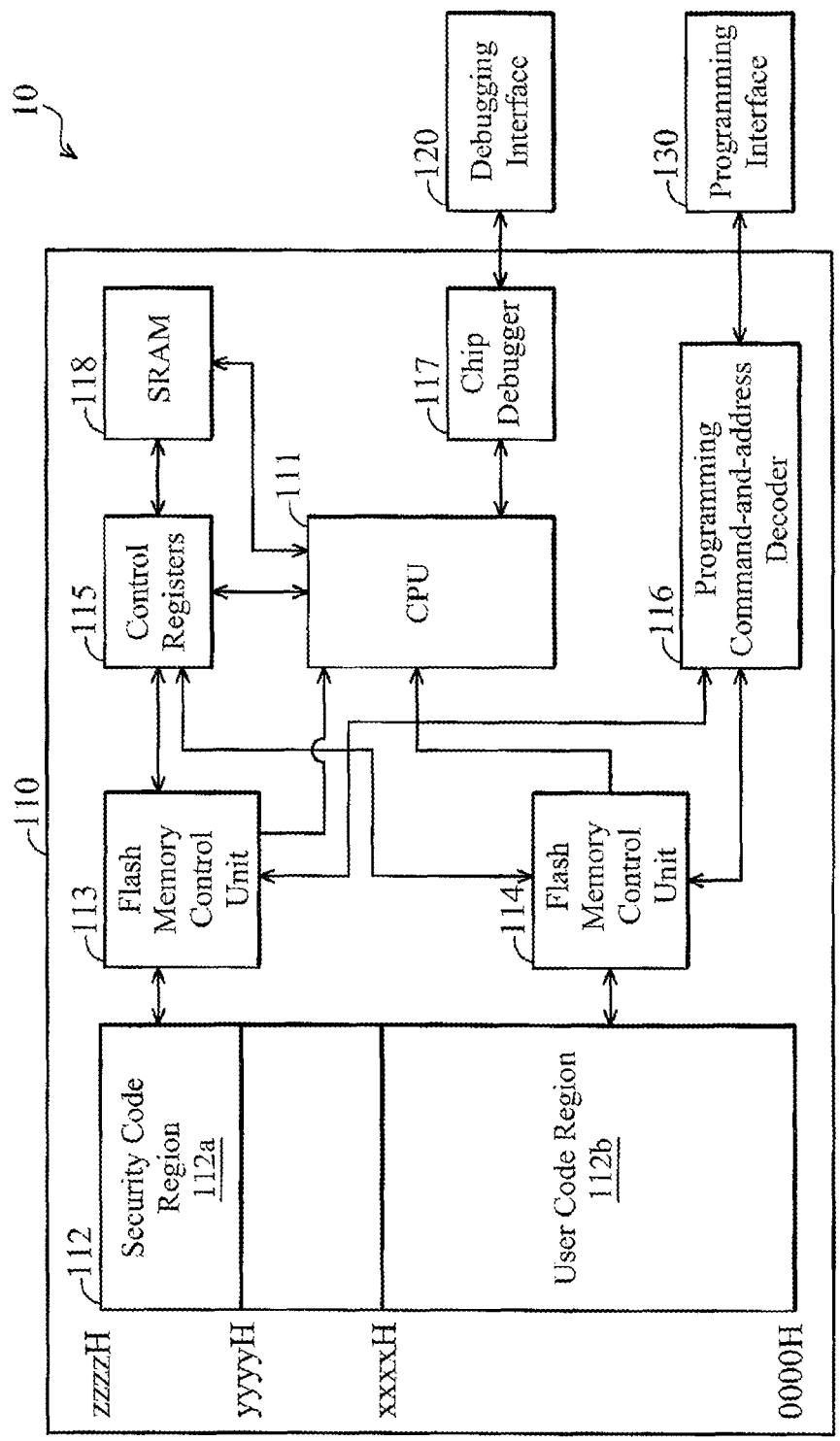
FIG. 1 shows a system block diagram of an electronic device according to an embodiment of the invention.

FIG. 1 shows a system block diagram of an electronic device 10 according to an embodiment of the invention. A micro controller 110 is installed in the electronic device 10, and a flash memory 112 of the micro controller 110 includes at least two regions: a security code region 112a with exemplary addresses ranging between yyyyH and zzzzH; and a user code region 112b with exemplary addresses ranging between 0000H and xxxxH. The flash memory 112 is a non-volatile memory, in which data will not disappear during power-down or power loss. The security code region 112a contains a security byte, which may be the most significant byte, the least significant byte or a byte at an arbitrary address. The security code region 112a and the user code region 112b may respectively store program code developed by different manufacturers or users. In alternative embodiments, the security code region 112a and the user code region 112b may store program code developed by different users of the same manufacturer, respectively, and the invention should not be limited thereto. For example, a first manufacturer (or a first user of a manufacturer) may store kernel program code or a customized library in the security code region 112a, and then provide to a second manufacturer (or a second user of the same manufacturer). The second manufacturer (or the second user of the same manufacturer) may store a main program in the user code region 112b, which calls the customized library stored in the security code region 112a when being executed, therefore benefiting the second manufacturer to shorten the product development cycle. The micro controller 110 may be integrated into a variety of products, such as telecommunications devices, televisions, storage devices, etc.

Although the embodiment has been described as having a flash memory, it should be noted that this is merely an exemplary feature, and the invention is equally applicable to electronic devices having other sorts of non-volatile memory, such as a EPROM (Erasable Programmable Read-Only Memory), a PROM (Programmable Read-Only Memory), a ROM (Read-Only Memory), an EEPROM (Electrically Erasable Programmable Read-Only Memory), etc. Thus, the flash memory control unit to be described below can be designated as an NVMMC (Non-Volatile Memory Management Controller) for controlling the non-volatile memory.

In some implementations, the whole flash memory is accessed by a single flash memory control unit, and the whole flash memory is erased when a CPU (Central Processing Unit) loads and executes an erase command. With improved security of stored program code, according to the embodiments of the invention, the security code region 112a and user code region 112b are accessed by independent flash memory control units 113 and 114, respectively, and two different commands are provided for erasing security code region 112a and user code region 112b, for example, commands "SEC_erase" and "user_erase", respectively. The two erase commands may be designated by different operation codes.

The electronic device 10 may additionally install a programming interface 130, thereby enabling a user to couple an external programmer to a programming command-and-address decoder 116 via the programming interface 130 and issue the aforementioned different commands to erase the security code region 112a and the user code region 112b, respectively. The programming command-and-address 116 instructs the flash memory control unit 113 to erase data from the security code region 112a when receiving the command to erase the security code region 112a. Or, the programming command-and-address 116 instructs the flash memory control unit 114 to erase data from the user code region 112b when receiving the command to erase the user code region 112b. In practice, a vendor making the micro controller 110 may provide the aforementioned commands to erase the security code region 112a and the user code region 112b to different clients (such as the aforementioned first and second manufacturers), respectively.

If the security byte is set to a designated value, such as "0xFF", then the security code region 112a is in the status of available to access (also referred to as an available status). Alternatively, if the security byte is set to any other than the designated value, then the security code region 112a is in the status of being protected from copying (also referred to as a protected status). The following introduces, in detail, a mechanism to protect the program code stored in the security code region 112a with the use of the security byte. The program code of the security code region 112a can be loaded and executed by the CPU 111 regardless which value is set in the security byte.

Figure 2:
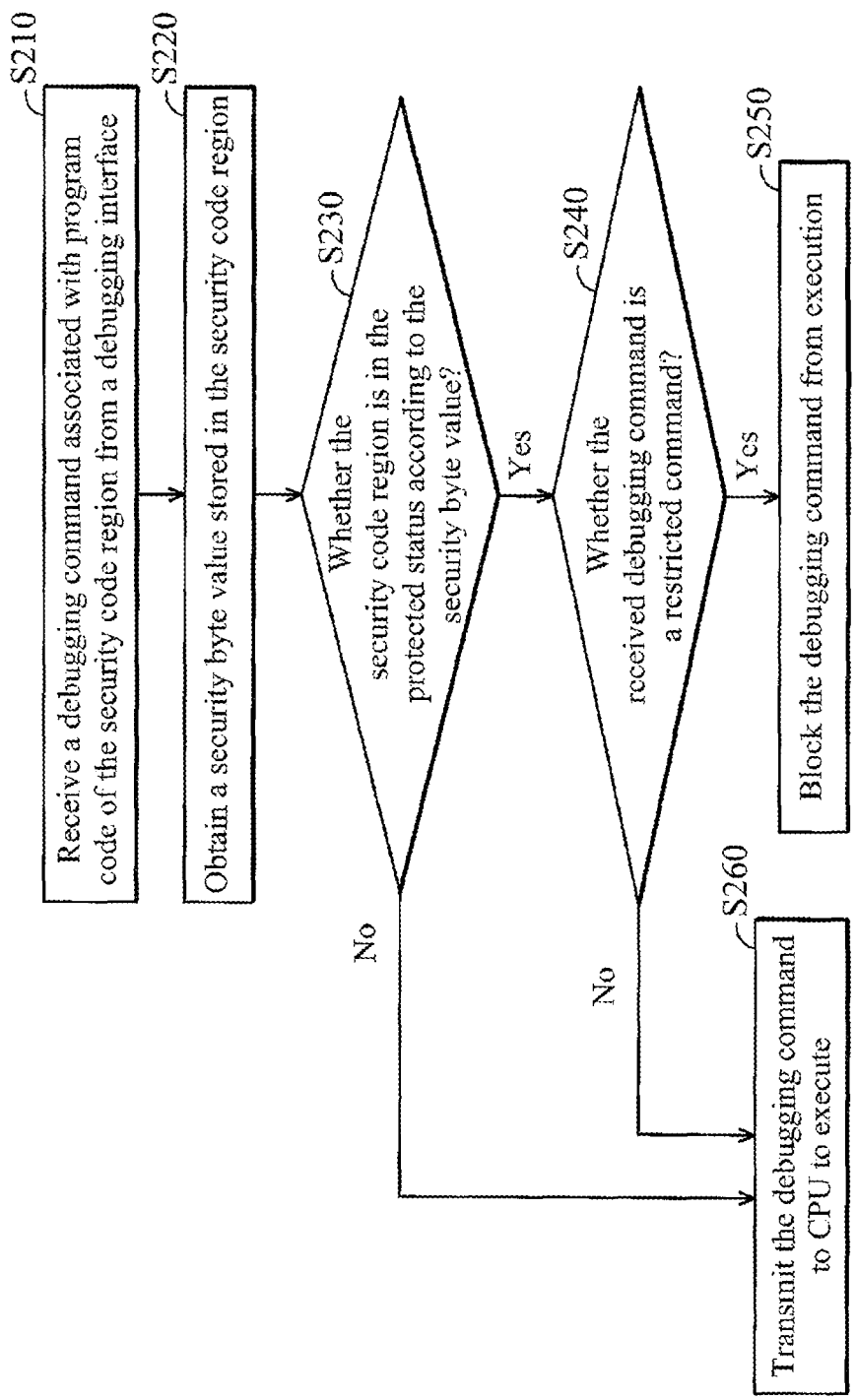
FIG. 2 is a flowchart illustrating a method for protecting the program code of the non-volatile memory, executed by a chip debugger, according to an embodiment of the invention.

To prevent the program code of the security code region 112a from being anticipated by reverse engineering methods while debugging, a chip debugger 117 refers to the security byte value and accordingly determines whether specific debugging commands are blocked. FIG. 2 is a flowchart illustrating a method for protecting the program code of the non-volatile memory, executed by the chip debugger 117, according to an embodiment of the invention. After a debugging command associated with the program code of the security code region 112a is received from a debugging interface 120 (step S210), the security byte value stored in the security code region 112a is obtained (step S220). In some embodiments, the security byte value may be read out by the CPU 111 and stored in a register (not shown) of the chip debugger 117 during the system (re)-booting. In the performance of step S220, the security byte value is obtained from the register of the chip debugger 117. In other embodiments, the chip debugger 117 requests the CPU 111 to read out the security byte value of the security code region 112a each time the chip debugger 117 receives a debugging command. Subsequently, the following determinations are performed according to the security byte value: whether the security code region 112a is in the protected status (step S230); and whether the received debugging command is a restricted command (step S240). The restricted command may be a breakpoint-setting command, a step run command, or a debugging mode command, etc. If the aforementioned determinations are satisfied, then the debugging command is blocked from execution (step S250). Alternatively, if any of the determinations are not satisfied, then the debugging command is transmitted to the CPU 111 to execute (step S260). Although the order of steps S230 and S240 is depicted in FIG. 2, it should be appreciated that steps S230 and S240 can be swapped. In some embodiments, step S240 may be omitted, and all commands from the debugging interface 120 are blocked from execution when it is determined that the security code region 112a is in the protected status according to the security byte value in step S230.

Details of the breakpoint-setting command and the step run command are described below. After the CPU 111 receives the breakpoint-setting command from the chip debugger 117, a signal telling the CPU 111 to temporarily suspend execution of a program is inserted at a specific point of the program code stored in the security code region 112a. Subsequently, when the CPU 111 detects the inserted signal during execution of the program code of the security code region 112a, the execution is suspended. After receiving the step run command, the CPU 111 executes the next instruction of the security code region 112a only, and then suspends the execution.

When the execution is suspended, a user may read out the current variables stored in an SRAM (Static Random Access Memory) 118 and the current content stored in a control register 115 through the chip debugger 117 to anticipate the program code of the security code region 112a. Therefore, to prevent the program code stored in the security code region 112a being anticipated by an unauthorized user, the execution of the breakpoint-setting command and the step run command is permissible when the security code region 112 is in the available status. On top of that, when the security code region 112a is in the protected status, the chip debugger 117 may block the debugging mode command to avoid the aforementioned problem.

Figure 3:
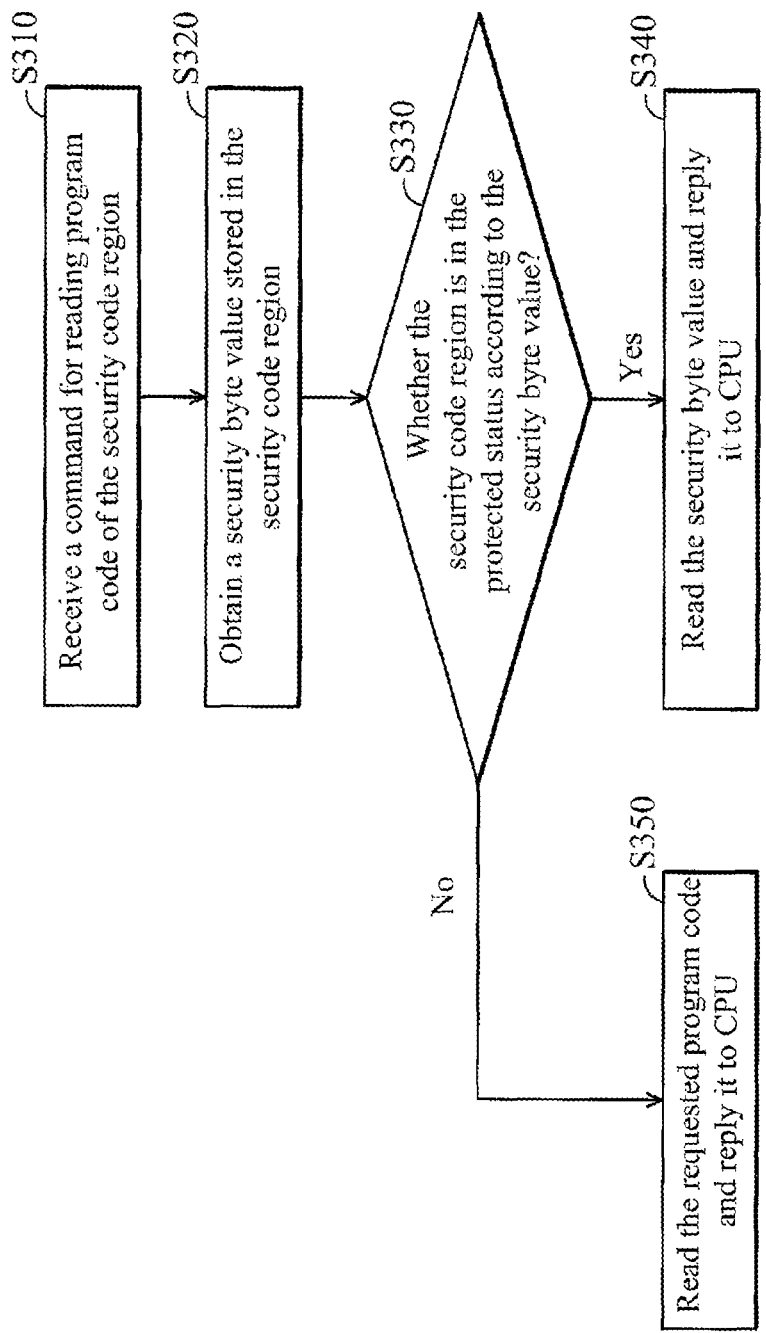
FIG. 3 is a flowchart illustrating a method for protecting the program code of the non-volatile memory, executed by a flash memory control unit, according to an embodiment of the invention.

To prevent the program code of the security code region 112a from unauthorized duplication, the flash memory control unit 113 may determine whether to block a data read command according to the security byte value. FIG. 3 is a flowchart illustrating a method for protecting the program code of the non-volatile memory, executed by the flash memory control unit 113, according to an embodiment of the invention. After a command to read the program code of the security code region 112a is received (step S310), the security byte value is obtained (step S320). In an embodiment, the received command may include an address range of the security code region 112a. In some embodiments for performing step S310, during execution of the program code of user code region 112b, the CPU 111 instructs the flash memory control unit 113 to access data in the security code region 112a by setting the control register 115. Those skilled in the art will appreciate that the described data read/write by setting the control register 115 is also referred to as the IAP (In Application Programming). In some other embodiments for performing step S310, the flash memory control unit 113 may receive a command to read the program code of the security code region 112a from the CPU 111. In still other embodiments, the flash memory control unit 113 may receive a command to read the program code of the security code region 112a from the programming command-and-address decoder 116, which is issued by an external programmer (not shown) connecting to the programming interface 130. Subsequently, it is determined whether the security code region 112a is in the protected status according to the security byte value (step S330). If so, the security byte value is read and replied to the CPU 111 (step S340), rather than the requested program code. Otherwise, the requested program code is read and replied to the CPU 111 (step S350). In some embodiments, step S340 may alternatively reply with an error message.

Although the embodiment has been described as having specific elements in FIG. 1, it should be noted that additional elements may be included to achieve better performance without departing from the spirit of the invention. Although the embodiment has been described having a flash memory, it should be noted that this is merely an exemplary feature, and the invention is equally applicable to electronic devices having other sorts of non-volatile memory, such as EPROM, PROM, ROM, EEPROM, etc. Thus, the flash memory control unit described above can be designated as an NVMMC for controlling the non-volatile memory. While the process flow described in FIGS. 2 and 3 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for securing program code stored in a non-volatile memory, comprising:
   a non-volatile memory comprising a first region and a second region;
   a first NVMMC (non-volatile memory management controller) coupled to the first region;
   a second NVMMC coupled to the second region; and
   a programming command-and-address decoder coupled to the first NVMMC and the second NVMMC, instructing the first NVMMC to erase data from the first region when receiving a first command to erase the first region via a programming interface, and instructing the second NVMMC to erase data from the second region when receiving a second command to erase the second region via the programming interface,
   wherein the first command and the second command have different command names and are designated by different operation codes,
   wherein the first region stores a customized library and the second region stores a main program, which calls the customized library, when being executed, and
   wherein the programming command-and-address decoder receives the first command to erase the customized library and the programming command-and-address decoder receives the second command to erase the main program.

2. The apparatus of claim 1, wherein the first NVMMC and the second NVMMC are independently controlled by the programming command-and-address decoder.

3. The apparatus of claim 1, wherein the first command is provided through the programming command-and-address decoder to erase the whole first region and the second command is provided through the programming command-and-address decoder to erase the whole second region.

* * * * *